United States Patent [19]

Keusch

[11] Patent Number: 5,297,904
[45] Date of Patent: Mar. 29, 1994

[54] MULTI-SPINDLE BORING MACHINE

[75] Inventor: Siegfried Keusch, Plochingen, Fed. Rep. of Germany

[73] Assignee: Reich Spezialmaschinen GmbH, Fed. Rep. of Germany

[21] Appl. No.: 958,493

[22] Filed: Oct. 8, 1992

[30] Foreign Application Priority Data

Oct. 11, 1991 [DE] Fed. Rep. of Germany ....... 4133786

[51] Int. Cl.5 ............................................. B23B 47/34
[52] U.S. Cl. ........................................ 408/67; 408/35; 408/95
[58] Field of Search ................... 29/26 A; 408/25, 35, 408/67, 95; 483/56

[56] References Cited

U.S. PATENT DOCUMENTS

| | | | |
|---|---|---|---|
| 3,115,051 | 12/1963 | Burg | 408/35 |
| 3,617,141 | 11/1971 | Sullivan | 408/35 |
| 4,822,219 | 4/1989 | Wood et al. | 408/67 |
| 4,850,754 | 7/1989 | Thornton et al. | 408/35 |

FOREIGN PATENT DOCUMENTS 43819  9/1910  Austria .................................. 408/35

Primary Examiner—Daniel W. Howell
Attorney, Agent, or Firm—W. Thad Adams, III

[57] ABSTRACT

The invention relates to a multi-spindle boring machine with machine table and suction arrangement in which the spindles are held on a carrier, which can be rotated by means of a vertical drive shaft, and in which an extractor fan can be connected to a suction duct, which ends in the area of the tool set in the working position and received by the spindle. With a central suction unit and individual exchangeable tool coverings, which can be connected with a covering distributor with connecting ducts to the central suction pipe, the invention provides for optimum suction, which can be adjusted to the different tools used.

8 Claims, 2 Drawing Sheets

MULTI-SPINDLE BORING MACHINE

The invention relates to a multi-spindle boring machine with machine table and suction arrangement in which the spindles are held on a carrier, which can be rotated by means of a vertical drive shaft, and in which an extractor fan can be connected to a suction duct, which ends in the area of the tool set in the working position and received by the spindle.

In the known multi-spindle boring machines, the suction duct is a flexible suction duct that is brought up to the tool in the working position and is arranged with its suction port at the side of the tool. The suction effect is not optimal in this case,, since the suction stream impairs the work when the suction force is selected high enough and the suction is only imperfect when the suction force is reduced, particularly if the spindles receive different tools such as individual borers, series boring units, grooving saws, fitting boring units or the like.

The object of the invention is a multiple boring machine of the type mentioned in the beginning in which optimum suction is achieved and the suction can be adjusted in a simple way to the different tools located in the spindles.

The invention achieves this object in that the drive shaft is hollow and receives a suction pipe so that it cannot rotate and is closed over the workpiece deposited on the machine table, having a suction port toward the working position, in that a covering distributor pivots on the suction pipe and is displaced synchronously with the carrier, in that the covering distributor has connecting ducts that are directed toward the spindles and can be selectively connected with the connecting ducts of the suction pipe, and in that tool coverings, adjusted individually by tool to the size of the tool in the spindle, can be connected with the connecting ducts.

The fixed suction pipe is directed with its suction port toward the spindle in the working position. The covering distributor is displaced synchronously with the carrier of the spindles so that its connecting ducts always remain directed toward the associated spindles. The tool coverings of the individual tools are exchangeable, that is, they can be connected selectively and with the connecting ducts of the covering distributor following tooling of the spindles. The tool covering can be connected with the connecting duct of the covering distributor by plug, locking or screw connection. The tool covering itself can be composed of one part or multiple parts. This will depend on the size and type of the tool to be covered.

In one development, the connecting ducts of the covering distributor are open downwardly and have an angle division that is determined by the number of spindles.

This development facilitates . the manufacture of the covering distributor, since it makes use of the fact that the tool seals the facing side of the covering distributor in operation. Accordingly, the development of the tool covering is selected so that it is open toward the machine table and is provided with openings for the associated tool.

When one development makes provision so that the side of the suction pipe facing the machine table is sealed with a plate, which is covered on the side f acing the machine table with a flexible plate, such as a felt plate, then the suction pipe can be used as a hold-down device for the tool without the risk of damage to the surface of the tool.

In one development, the pivot bearing for the covering distributor is such that the covering distributor pivots with a casing-like neck on the suction pipe and this neck is held between fixing rings so that it cannot be displaced axially but can rota te on the suction pipe.

The synchronous turning of the covering distributor with the carrier of the spindles is achieved in a simple way in that a driver receiver is mounted on the carrier and receives a driver that is connected with the covering distributor and can be disp laced axially to a limited extent.

For vertical displacement of the suction pipe, it can be displaced by means of a vertical displacement device in the drive shaft. For operation of the multi-spindle boring machine, the spindles in a further development can be displaced by vertical displacement devices, and the vertical displacement device of the suction pipe can be actuated before the vertical displacement device of the work spindle at the beginning of the working cycle, and the vertical displacement device of the work spindle can be reset before the vertical displacement device of the suction pipe in order to achieve a well-defined suction during the entire working cycle, provision also being made so that the extractor fan can be switched on and of f with the displacement of the suction pipe.

The invention is explained in more detail using an example embodiment illustrated in the drawings.

Figure 1:
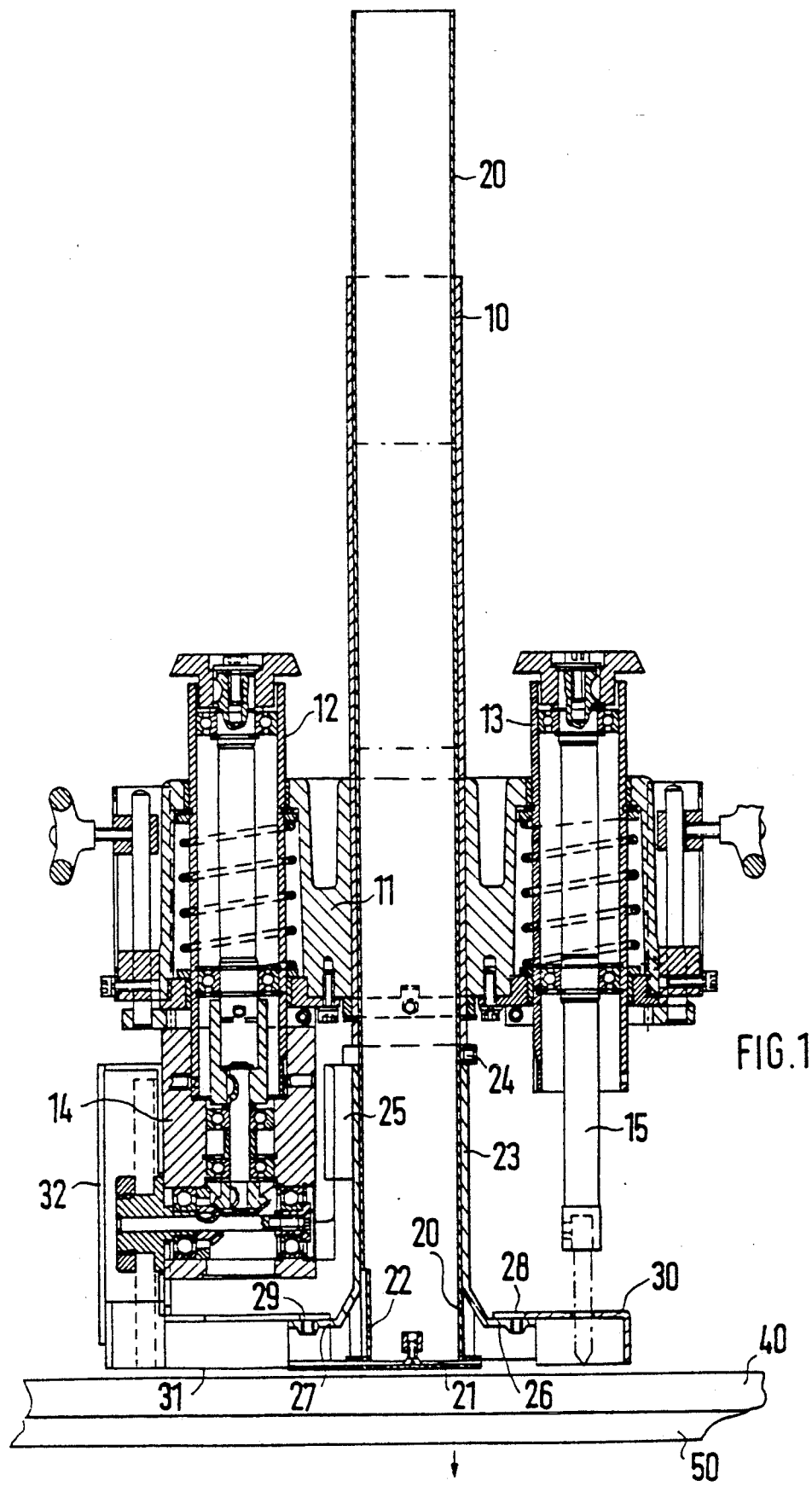
FIG. 1 is a partial section of a multi-spindle boring machine, which covers only those parts related with the suction.

Of the drive units of the multi-spindle boring machine, FIG. 1 only shows the vertical drive shaft 10 on which a carrier 11 for the spindles 12 and 13 is set in non-turning arrangement. The drive devices f or rotation of the spindle receivers and the vertical displacement device for the work spindle are not shown since they are of no significance for the present invention and can have any known design.

The drive shaft 10 in the embodiment is designed as a hollow shaft and receives a suction pipe 20 with an outer diameter suitable for the inner diameter of this hollow shaft. This suction pipe 20 is connected in a known way with the extractor fan. The spindles 12 and 13 can receive different tools such as a grooving saw 14 or an individual borer 15. The workpiece 40 to be processed is deposited on the machine table 50.

Figure 2:
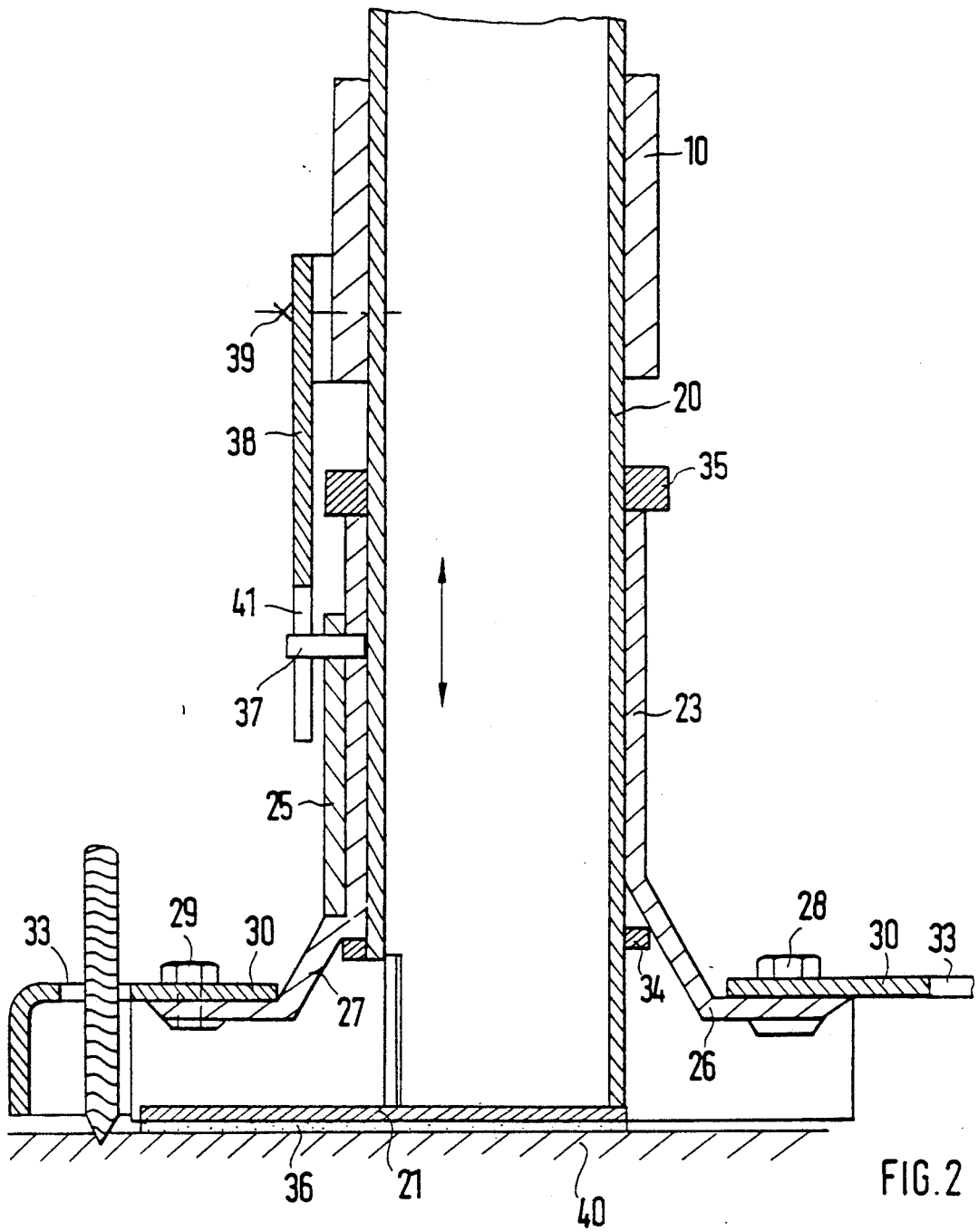
FIG. 2 is an enlarged partial section of the area with the covering distributor and the tool coverings.

As FIG. 2 shows, the bottom side of the suction pipe 20 is sealed with a plate 21 and has a side suction port 22, which is directed toward the working position of the multi-spindle boring machine. The suction pipe 20 is held at the upper end in a non-turning condition in the drive shaft 10 through the connection of the extractor fan or through suitable holding means so that the suction port 22 always maintains the position set.

A covering distributor 23 pivots on the bottom part of the suction pipe 20, which projects out of the carrier 11. For this purpose, the covering distributor 23 has a casing-like neck, which is held on the suction pipe 20 between the two fixing rings 34 and 35 so that it cannot be displaced axially but can rotate freely.

The covering distributor 23 changes at its end facing the machine table 50 into connecting ducts 26 and 27 radiating outwardly. The number and angle division depends on the number and angular position of the spindles 12 and 13 in the carrier 11. These connecting ducts 26 and 27 can be open toward the machine table 50, since the workpiece 40 closes of f this side of the covering distributor during the operation. These connecting ducts 26 and 27 can be mounted with tool coverings 30 and 31, which are pushed up part way on and screw-connected with the connecting ducts 26 and 27, as screw connections 28 and 29 show. If the tool is an individual borer 15, the tool covering 30 has only one opening 33. If, as FIG. 1 shows, the tool is, for example, a grooving saw 14, then the tool covering will preferably have two parts 31 and 32, part 31 forming the connection to the connecting duct 27, and part 32 covering the saw blade.

The plate 21 can be covered on the side facing the machine table 50 with a felt plate 36. If the suction pipe 20 has a vertical displacement device, the suction pipe can then be displaced vertically in the drive shaft 10 and be used as a hold-down device for the workpiece 40. As FIG. 2 shows, a driver receiver 38 is screwed tightly to the carrier 11, as the screw connection 39 shows. This plate-like driver receiver 38 has a vertical slot into which a driver projects and is mounted with the guide plate 25 on the covering distributor 23. This ensures that the covering distributor 23 will be turned synchronously with the carrier 11 and thus with the spindles 12 and 13. The tool coverings 30, 31 and 32 thus always remain associated with the spindles 12 and 13. The suction pipe 20 with the covering distributor 23 and the tool coverings 30, 31 and 32 remains vertically displaceable as a unit, this independently of the spindles 12 and 13. This permits an operation of the multi-spindle boring machine in which the suction pipe 20 can be displaced in the direction of the machine table 50 before the work spindle at the beginning of the work cycle, while the work spindle is reset before the suction pipe 20 at the end of the work cycle. In addition, the extractor fan can be switched on and off with the displacement of the suction pipe 20.

I claim:

1. A boring machine comprising:
   (a) a plurality of rotatable spindles held on a carrier mounted for rotation by a hollow drive shaft, said spindles adapted for carrying tools for engaging a workpiece supported by a machine table in a working position;
   (b) a suction apparatus including an extractor fan for removing workpiece debris from the area of the spindles, said suction apparatus comprising:
   (c) a suction pipe communicating with the area of the working position of the spindles above the surface of the machine table;
   (d) said suction pipe being non-rotatably mounted within said hollow drive shaft, said suction pipe having a closed end for being positioned over the workpiece;
   (e) a suction port formed in a sidewall of said suction pipe for receiving workpiece debris; and
   (f) a covering distrubutor rotatably mounted on said suction pipe and communicating with said suction port, said covering distributor including connecting duct means communicating with said suction port and, upon rotation of the covering distributor, said connecting duct means being thereby rotated to a position adjacent the spindles for removing workpiece ebris from the area of the workpiece and conveying the workpiece ebris to the suction pipe.

2. A boring maching according to claim 1, wherein the connecting duct means of the covering distributor are open downwardly and have an angle division that is determined by the number of spindles.

3. A boring maching according to claim 1 or 2, further comprising tool coverings opening toward the machine table with openings for the associated tool.

4. A boring maching according to claim 2, wherein the closed end of the suction pipe is closed with a plate, and further wherein the side of the plate facing the maching table is covered with a felt pad.

5. A boring machine according to claim 1, wherein the covering distributor includes a casing-like neck by which it is mounted on the suction pipe for previnting axial displacement while permitting rotation of said covering distributor on said suction pipe.

6. A boring maching according to claim 1, wherein a driver receiver is mounted on the carrier and receives a driver connected to the covering distributor for preventing axial displacement.

7. A boring machine according to claim 1, and including a first vertical displacement device in the drive shaft for reciprocally displacing the suction pipe in relatin to the machine table.

8. A boring machine according to claim 7, and including a second vertical displacement device for reciprocally displacing the spindles in relation to the machine table.

* * * * *